United States Patent
Tang (10) Patent No.: US 11,555,298 B2
(45) Date of Patent: Jan. 17, 2023

(54) LOCKING SIDE SPRAYER

(71) Applicant: Delta Faucet Company, Indianapolis, IN (US)

(72) Inventor: Yilin Tang, Guangzhou (CN)

(73) Assignee: Delta Faucet Company, Indianapolis, IN (US)

( * ) Notice: Subject to any disclaimer, the term of this patent is extended or adjusted under 35 U.S.C. 154(b) by 235 days.

(21) Appl. No.: 16/746,059

(22) Filed: Jan. 17, 2020

(65) Prior Publication Data

US 2021/0222409 A1 Jul. 22, 2021

(51) Int. Cl.
| | |
|---|---|
| *E03C 1/04* | (2006.01) |
| *E03C 1/02* | (2006.01) |
| *B05B 12/00* | (2018.01) |
| *B05B 1/12* | (2006.01) |
| *F16K 31/363* | (2006.01) |
| *B05B 1/16* | (2006.01) |
| *F16K 11/00* | (2006.01) |
| *B05B 1/30* | (2006.01) |
| *B05B 1/18* | (2006.01) |

(52) U.S. Cl.
CPC .............. *E03C 1/0404* (2013.01); *B05B 1/12* (2013.01); *B05B 12/0024* (2018.08); *E03C 1/023* (2013.01); *E03C 1/04* (2013.01); *B05B 1/1618* (2013.01); *B05B 1/18* (2013.01); *B05B 1/3026* (2013.01); *E03C 1/0401* (2013.01); *E03C 1/0412* (2013.01); *E03C 2001/0415* (2013.01); *E03C 2201/30* (2013.01); *F16K 19/006* (2013.01); *F16K 31/363* (2013.01)

(58) Field of Classification Search
CPC .......... E03C 1/0404; E03C 1/023; E03C 1/04; E03C 1/0401; E03C 1/0412; E03C 2001/0412; E03C 2201/30; B05B 1/12; B05B 1/1618; B05B 1/18; B05B 1/3026; B05B 12/0024; F16K 19/006; F16K 31/363
See application file for complete search history.

(56) References Cited

U.S. PATENT DOCUMENTS

| | | | |
|---|---|---|---|
| 2,991,945 A * | 7/1961 | Rosenkranz | B05B 9/01 251/114 |
| 4,187,986 A | 2/1980 | Petrovic | |
| 4,927,115 A | 5/1990 | Bahroos et al. | |
| 4,934,402 A | 6/1990 | Tarnay et al. | |
| 5,433,384 A | 7/1995 | Chan et al. | |
| 5,687,952 A | 11/1997 | Arnold et al. | |
| 5,971,299 A | 10/1999 | Loschelder | |
| 6,086,045 A * | 7/2000 | Moon | F16K 35/025 251/114 |

(Continued)

FOREIGN PATENT DOCUMENTS

| | | |
|---|---|---|
| CN | 1498686 A | 5/2004 |
| CN | 1653882 A | 8/2005 |

(Continued)

*Primary Examiner* — Patrick C Williams
(74) *Attorney, Agent, or Firm* — Bose McKinney & Evans LLP (57) ABSTRACT

A side sprayer includes an inactive configuration, a normal active configuration, and a locked active configuration. The side sprayer includes three buttons to allow the user to transition between configurations of the side sprayer.

22 Claims, 9 Drawing Sheets

(56) References Cited

U.S. PATENT DOCUMENTS

| | | | |
|---|---|---|---|
| 6,173,911 B1 * | 1/2001 | Hui-Chen | B05B 12/0022 239/526 |
| 6,296,011 B1 | 10/2001 | Esche et al. | |
| 6,352,212 B1 | 3/2002 | Wang | |
| 6,659,373 B1 | 12/2003 | Heren et al. | |
| 6,685,110 B2 | 2/2004 | Wang | |
| 6,738,996 B1 | 5/2004 | Malek et al. | |
| 7,000,854 B2 | 2/2006 | Malek et al. | |
| 7,721,761 B2 | 5/2010 | Thomas | |
| 7,909,269 B2 | 3/2011 | Erickson et al. | |
| 8,424,781 B2 | 4/2013 | Rosko et al. | |
| 8,863,769 B2 | 10/2014 | Andersen et al. | |
| 9,050,612 B2 * | 6/2015 | Miller | B05B 1/18 |
| 9,243,389 B2 | 1/2016 | Thomas et al. | |
| 9,895,702 B2 | 2/2018 | Lei | |
| 9,926,690 B2 | 3/2018 | Peteri | |
| 9,962,718 B2 | 5/2018 | Vogel et al. | |
| 10,046,339 B2 | 8/2018 | Zhou et al. | |
| 10,245,606 B2 | 4/2019 | Chiu et al. | |
| 2005/0001070 A1 * | 1/2005 | Wu | B05B 1/3013 239/526 |
| 2005/0178857 A1 * | 8/2005 | Roman | B05B 12/0026 239/525 |
| 2006/0266851 A1 * | 11/2006 | Wang | B05B 1/3026 239/526 |
| 2008/0289097 A1 | 11/2008 | Jeong | |
| 2017/0087574 A1 * | 3/2017 | Sunaba | F16K 31/607 |
| 2017/0101304 A1 * | 4/2017 | Geipel | B67D 7/42 |
| 2018/0195257 A1 | 7/2018 | Hu et al. | |
| 2018/0274214 A1 | 9/2018 | Rosko et al. | |

FOREIGN PATENT DOCUMENTS

| | | |
|---|---|---|
| CN | 102688816 | 10/2014 |
| CN | 108625435 A | 10/2018 |
| CN | 109926213 A | 6/2019 |
| KR | 101836763 | 3/2018 |
| WO | 2009143352 A1 | 11/2009 |

* cited by examiner

LOCKING SIDE SPRAYER

BACKGROUND AND SUMMARY

The present disclosure relates to accessory sprayers for use with a faucet and/or sink assembly. More specifically, the present disclosure relates to accessory sprayers, or side sprayers, having an inactive configuration, a normal active configuration, and a locked active configuration.

Consumers often desire to use sprayers for a variety of reasons, including loosening and removing debris from dishes, loosening and removing dirt from food, cleaning a variety of products, and other reasons. Sprayers may be built into faucets as part of a delivery spout or may be included as an accessory sprayer, such as a side sprayer. Conventional accessory sprayers either lock into place, creating inefficiency for users who wish to use the sprayer in a quick and/or inefficient manner, or require the user to hold down a button to utilize the sprayer. A solution is desired to allow the user to switch quickly and efficiently between a normal sprayer configuration and a locked sprayer configuration.

The illustrative sprayer of the present disclosure offers a sprayer for mounting with or beside a faucet assembly, wherein the sprayer offers an inactive configuration, a normal active configuration, and a locked active configuration. The illustrative side sprayer includes three buttons to allow the user to transition between configurations of the side sprayer.

According to an illustrative embodiment of the present disclosure, a sprayer assembly includes a housing, and a waterway insert positioned within the housing and defining a waterway. A first button is supported by at least one of the housing or the waterway insert. A first piston is operably coupled to the first button, and is movable between a first position and a second position. The first piston in the first position prevents fluid flow through the waterway from an inlet to an outlet, and the first piston in the second position permits fluid flow through the waterway from the inlet to the outlet. A second button is supported by at least one of the housing or the waterway insert, and a locker is operably coupled to the second button. The locker is movable to an engaged position to maintain the first piston in the second position. A diverter is disposed within the housing and selectively engages with the locker, the diverter configured to selectively maintain the locker in the engaged position. A third button is supported by at least one of the housing or the waterway insert, and a second piston is operably coupled to the third button and to the diverter. The second piston is movable between a first position and a second position, the second piston in the second position configured to disengage the diverter from the locker.

According to another illustrative embodiment of the present disclosure, a sprayer assembly includes a hose and a body fluidly coupled to the hose. The body includes a housing, a waterway insert positioned within the housing, a lever coupled to the waterway insert, and a first button operably coupled to the lever. A first piston is operably coupled with the lever, and a first spring is operably coupled with the first piston to bias the first piston toward the lever. A locker is in selective contact with the lever. A second button is operably coupled to the locker, the locker defining a receiving notch. A diverter is disposed within the waterway insert and is in selective contact with the receiving notch of the locker. The diverter defines a piston opening and a spring operably coupled to the diverter to bias the diverter away from the locker. A second piston is disposed through the piston opening of the diverter, the second piston including a cam surface in selective contact with the diverter. A third button is operably coupled to the second piston.

According to a further illustrative embodiment of the present disclosure, a sprayer assembly includes a housing, and a waterway extending within the housing. An activation input is supported for movement relative to the housing, and an activation valve member is operably coupled to the activation input. The activation valve member is movable between a closed position and an open position. The activation valve member in the closed position prevents fluid flow through the waterway, and the activation valve member in the open position permits fluid flow through the waterway. A lock input is supported for movement relative to the housing, and a lock device is operably coupled to the lock input. The lock device is movable between a released position and a locked position to maintain the movable valve member in the open position.

According to yet another illustrative embodiment of the present disclosure, a method of operating a side sprayer includes applying force on a first button to place the side sprayer in a first configuration, wherein fluid may flow from an outlet of a body of the side sprayer as long as force is continually applied to the first button. The method further includes applying force on a second button to place the side sprayer in a second configuration, wherein fluid may flow from the outlet of the body of the side sprayer even when force is not continually applied to the first button or the second button. The method illustratively may further include applying force on a third button to place the side sprayer in a third configuration or closing a valve to place the side sprayer in the third configuration, wherein fluid is prevented from flowing from the outlet of the body of the side sprayer.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION

The embodiments of the disclosure described herein are not intended to be exhaustive or to limit the disclosure to the precise forms disclosed. Rather, the embodiments described herein enable one skilled in the art to practice the disclosure.

Figure 1:
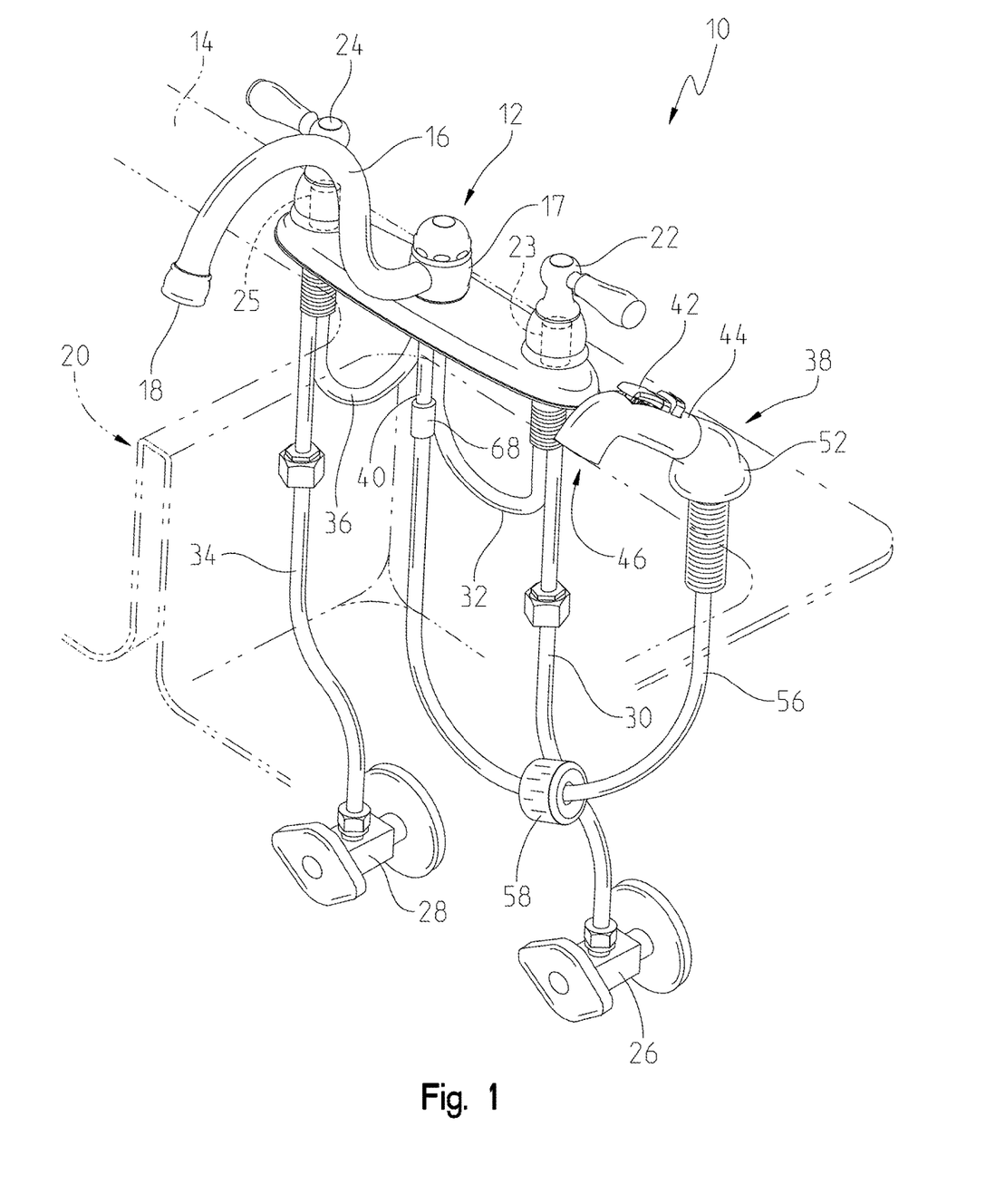
FIG. 1 is a perspective view of an illustrative sink assembly according to the present disclosure, wherein the sink assembly includes a faucet assembly with a side sprayer mounted to a sink deck.

Referring initially to FIG. 1, an illustrative sink assembly 10 is disclosed. The sink assembly 10 includes a faucet assembly 12 coupled to a sink deck 14. The illustrative faucet assembly 12 includes a spout 16, and the spout 16 includes an outlet 18 disposed over a sink basin 20. The faucet assembly 12 may further include a first handle, or cold water handle 22, and a second handle, or hot water handle 24. The cold water handle 22 is operatively coupled to a cold water supply, illustratively a conventional cold water stop 26, to selectively provide cold water to the spout 16. The hot handle 24 is operatively coupled to a hot water supply, illustratively a hot water stop 28, to selectively provide hot water or fluid to the spout 16. The spout 16 is illustratively coupled to a mixing hub 17, wherein the mixing hub 17 is in fluid communication with the cold water supply 26 and the hot supply 28 via a cold water outlet line 32 and a hot water outlet line 36, respectively, as described further herein. The mixing hub 17 illustratively mixes the cold water from the cold water supply 26 and the hot water from the hot water supply 28 to deliver mixed water to the outlet 18 of the spout 16 at a desired temperature.

For example, actuation of the cold water handle 22 operates a cold water valve 23 controlling the flow of water from the cold water supply 26 through a cold water supply line 30 into the spout 16 via the cold water outlet line 32. Similarly, actuation of the hot water handle 24 operates a hot water valve 25 controlling the flow of water from the hot water supply 28 through a hot water supply line 34 into the spout 16 via the hot water outlet line 36. In the illustrative embodiment as shown in FIG. 1, the position of the cold water handle 22 is shown in a position such that the cold water valve 23 stops the flow of water between the cold water supply 26 and the spout 16. Similarly, the position of the hot water handle 24 is shown in a position such that the hot water valve 25 stops the flow of water between the hot water supply 28 and the spout 16. As the handles 22 and 24 are rotated relative to the sink deck 14, the flow of water to the spout 16 increases or decreases until flow reaches a peak flow or completely stops, respectively. In another illustrative embodiment, hot and cold water valves 23 and 25 and associated handles 22 and 24 may be replaced with a single mixing valve and associated handle (not shown).

Still referring to FIG. 1, the sink assembly 10 illustratively includes a side sprayer 38. The side sprayer 38 is illustratively in fluid communication with the mixing hub 17 via a sprayer outlet line 40. The side sprayer 38 can provide an alternate or simultaneous fluid outlet relative to the outlet 18 of the spout 16. In the illustrated embodiment, a user may selectively use the side sprayer 38 via operation of an activation input or button 42 as described further herein.

Figure 2:
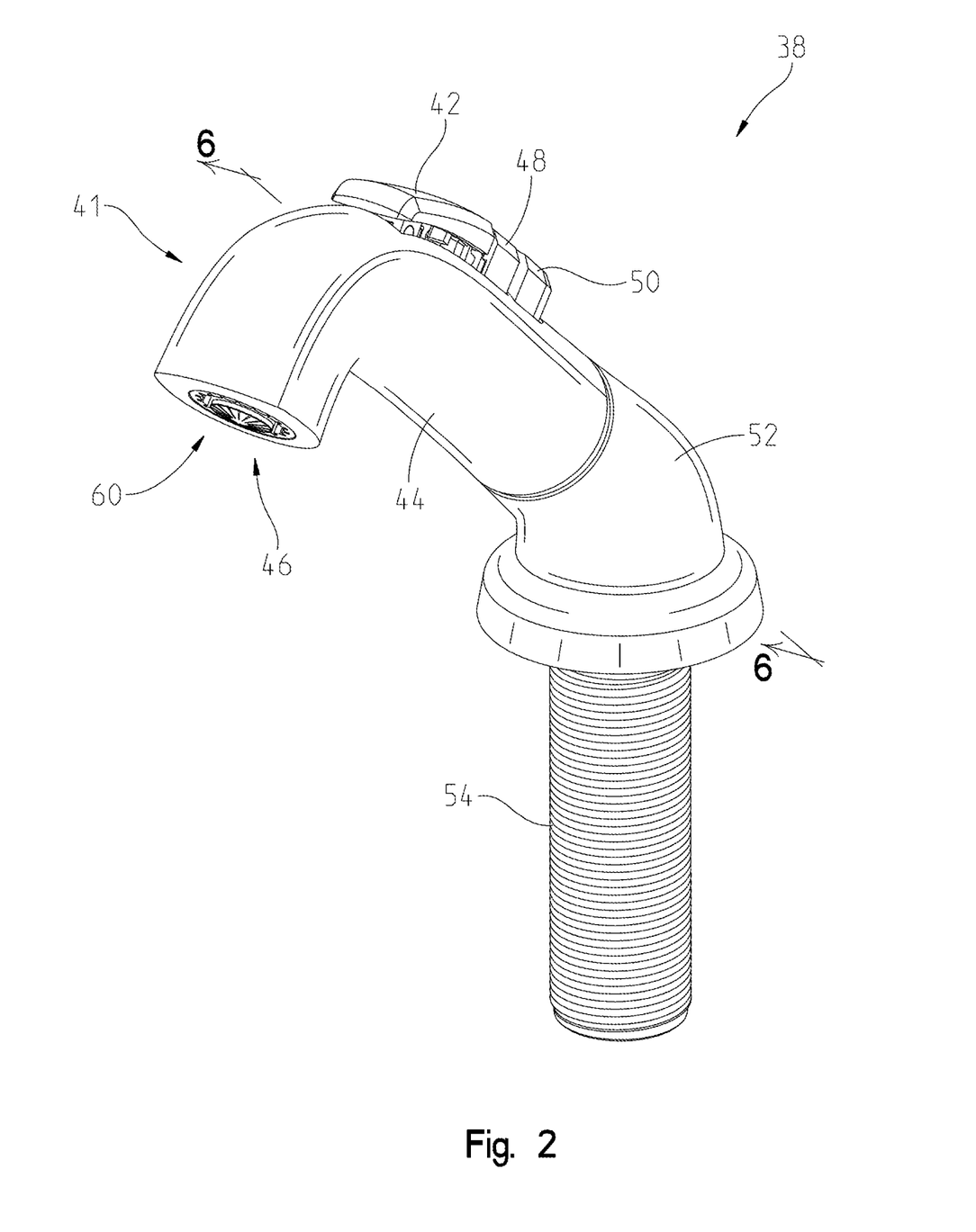
FIG. 2 is a front perspective view of the illustrative side sprayer of FIG. 1, wherein the side sprayer is not mounted to the sink deck.

Now referring to FIG. 2, the side sprayer 38 is illustrated apart from the sink assembly 10 (FIG. 1). The illustrative side sprayer 38 includes a sprayhead 41 having a body 44 extending between an inlet 45 and an outlet 46. The side sprayer 38 further illustratively includes first, second and third user inputs, such as an operation or activation button 42, a locking button 48, and a release button 50 as discussed further herein. The side sprayer 38 illustratively further includes a base 52 configured to selectively seat the body 44 of the side sprayer 38 as desired by the user. The body 44 of the side sprayer 38 may be seated on the base 52 when the side sprayer 38 is not in use. The body 44 of the side sprayer 38 may also be seated on the base 52 when the side sprayer 38 is in use, as desired by the user. The base 52 is coupled to a mount, illustratively a threaded shank 54, configured to facilitate the coupling of the side sprayer 38 to the sink deck 14 (FIG. 1). In other illustrative embodiments, the shank 54 may facilitate the coupling of the side sprayer 38 directly to the faucet assembly 12 (FIG. 1).

Referring again to FIG. 1, the illustrative side sprayer 38 may also include a flexible hose 56 in fluid communication with the side sprayer outlet line 40, which is illustratively stored beneath the sink deck 14 when not in use. The hose 56 allows a user to remove the body 44 of the side sprayer 38 from the base 52 for easier manipulation of the position of the side sprayer 38, and therefore the angle of the spray from the outlet 46 of the side sprayer 38. An optional weight 58 may be disposed on the hose 56 of the side sprayer 38 to assist in retracting the hose 56 below the sink deck 14 and facilitate placement of the body 44 of the side sprayer 38 on the base 52 when not in use.

Figure 3:
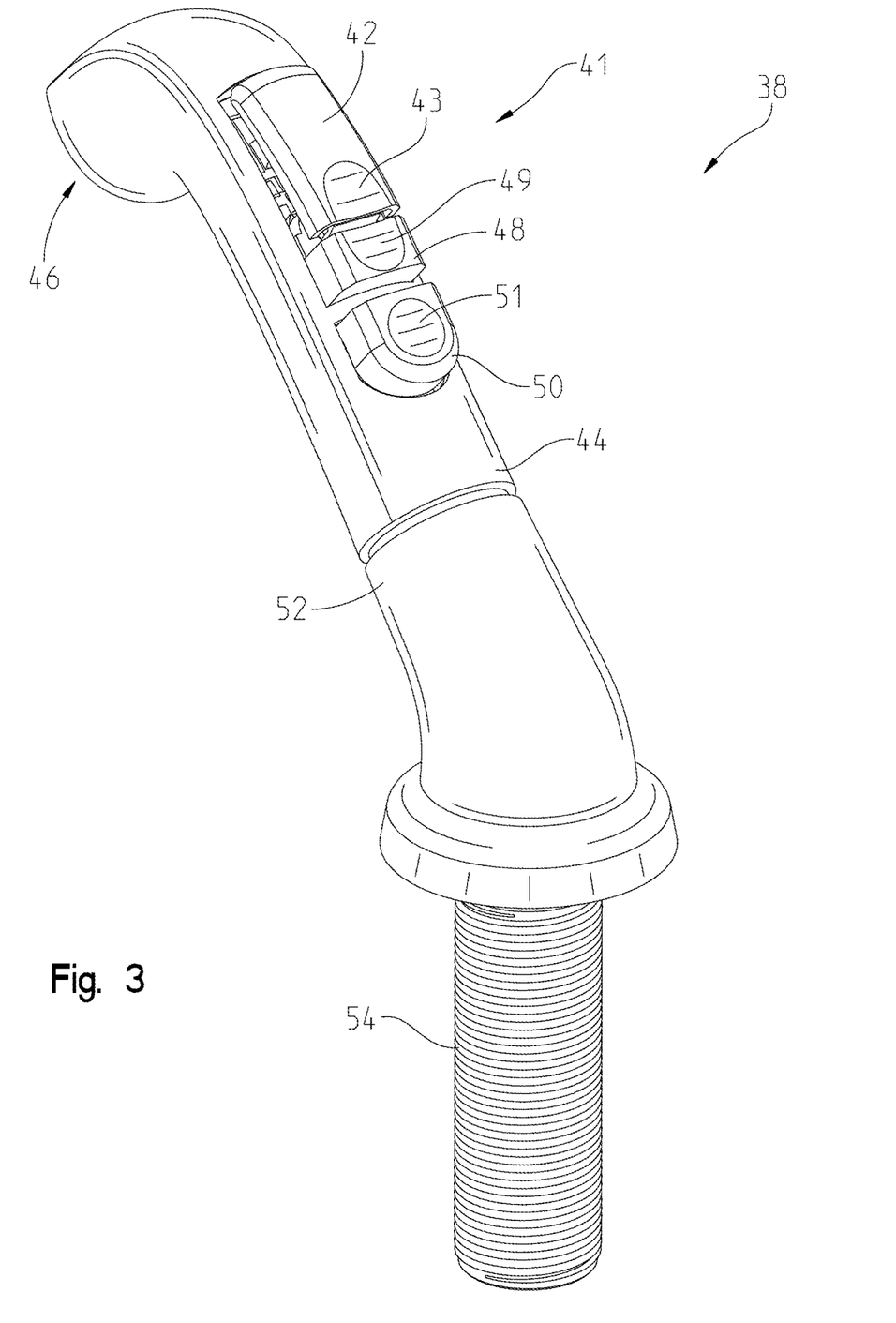
FIG. 3 is a rear perspective view of the illustrative side sprayer of FIG. 1, wherein the side sprayer is not mounted to the sink deck.

FIG. 3 illustrates the side sprayer 38 as shown in FIG. 2 from a rear view. As discussed in reference to FIG. 3, the illustrative side sprayer 38 includes the activation button 42, the locking button 48, and the release button 50, all supported for movement relative to the body 44. For ease of use, the activation button 42, the locking button 48, and the release button 50 may include button indentations 43, 49, and 51 respectively. For example, button indentations 43, 49 and 51 may be included on the activation button 42, the locking button 48, and the release button 50 for ergonomic reasons. In other words, the button indentations 43, 49 and 51 facilitate identification of the push points of the respective buttons, providing ease of use for the user. The indentations 43, 49 and 51 may also include indicia (e.g., letters, numbers, and/or symbols).

Figure 4:
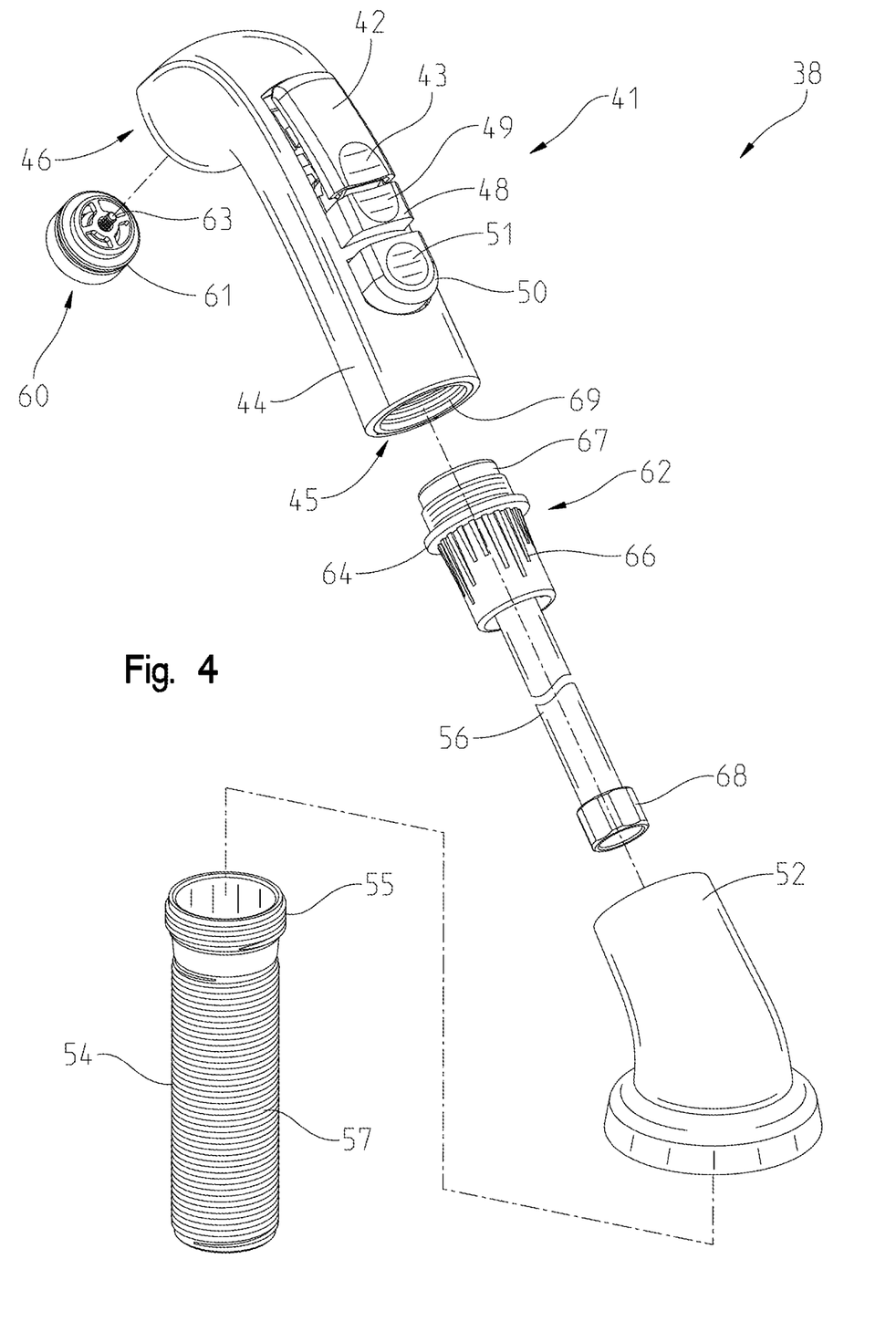
FIG. 4 is a partially exploded perspective view of the illustrative side sprayer of FIG. 3, the side sprayer including a spray nozzle assembly, a body, a hose, a base, and a mount.

Now referring to FIG. 4, a partially exploded view of the side sprayer 38 is illustrated. A spray nozzle assembly 60 is positioned at the outlet 46 of the side sprayer 38. As illustrated, the spray nozzle assembly 60 is removably coupled to the body 44 of the side sprayer 38 by interference fit via an o-ring 61 or efficiency in replacing the spray nozzle assembly 60 or otherwise removing the spray nozzle assembly 60 if desired while maintaining a fluid-tight seal between the spray nozzle assembly 60 and the body 44 of the side sprayer 38. In other embodiments, the spray nozzle assembly 60 may be coupled to the body 44 in other ways, for example, via threading, adhesive, mechanical fastener, single-piece manufacturing, overmolding, or other processes known in the art. The spray nozzle assembly 60 may be further secured to the body 44 of the side sprayer 38 with a fastener 63 or may only be secured to the body 44 of the side sprayer 38 with the fastener 63. The spray nozzle assembly 60 may include a plurality of nozzles 65 and/or an aerator (not shown).

The hose 56 is illustratively coupled to the side sprayer 38 via a coupling member 62 as described further herein. The coupling member 62 may fluidly couple with the body 44 of the side sprayer 38 via external threading 67 and mating internal threading 69 for efficiency in replacing the coupling member 62 or otherwise removing the coupling member 62 and/or the hose 56 if desired. In other illustrative embodiments, the hose 56 may be coupled to the body 44 in other ways, for example, via interference fit, another mechanical fastener, adhesive, single-piece manufacturing, overmolding, or other processes known in the art. The coupling member 62 illustratively includes a flange 64 and ridges 66 to facilitate the nesting of the side sprayer 38 on the base 52. For example, the flange 64 is configured to rest on the base 52 to ensure a proper amount of the hose 56 is disposed through the base 52. Similarly, the ridges 66 provide guidance for placement and for retaining of the side sprayer 38 in the proper position on the base 52.

As further illustrated in FIG. 4, the hose 56 is disposed through the base 52 and the shank 54 to facilitate operative coupling of the side sprayer outlet line 40 with the outlet 46 of the side sprayer 38 via a fluid coupler, such as a coupling nut 68 as shown in FIGS. 1 and 4. Referring again to FIG. 4, the shank 54 includes upper threading 55 to facilitate coupling to the base 52. In other illustrative embodiments, the shank 54 may be coupled to the base 52 in other ways, for example, via interference fit, adhesive, mechanical fastener, single-piece manufacturing, overmolding, or other processes known in the art.

The shank 54 further includes lower threading 57 to facilitate mounting of the side sprayer 38 to the sink deck 14 (FIG. 1). For example, the shank 54 is disposed through an opening in the sink deck 14 (FIG. 1) so that the threading 57 is exposed below the sink deck 14 (FIG. 1). A mounting nut (not shown) is then mated to the threading 57 to hold the shank 54 in position. As mentioned above, the side sprayer 38 may be otherwise mounted to the faucet assembly 12 (FIG. 1) or another location as desired by the user. The side sprayer 38 may be coupled to the sink deck 14 or the faucet assembly 12 in other ways, including alternately structured mounts, adhesive, a mechanical fastener, interference fit, adhesive, single piece manufacturing, overmolding, or other processes known in the art.

Figure 5:
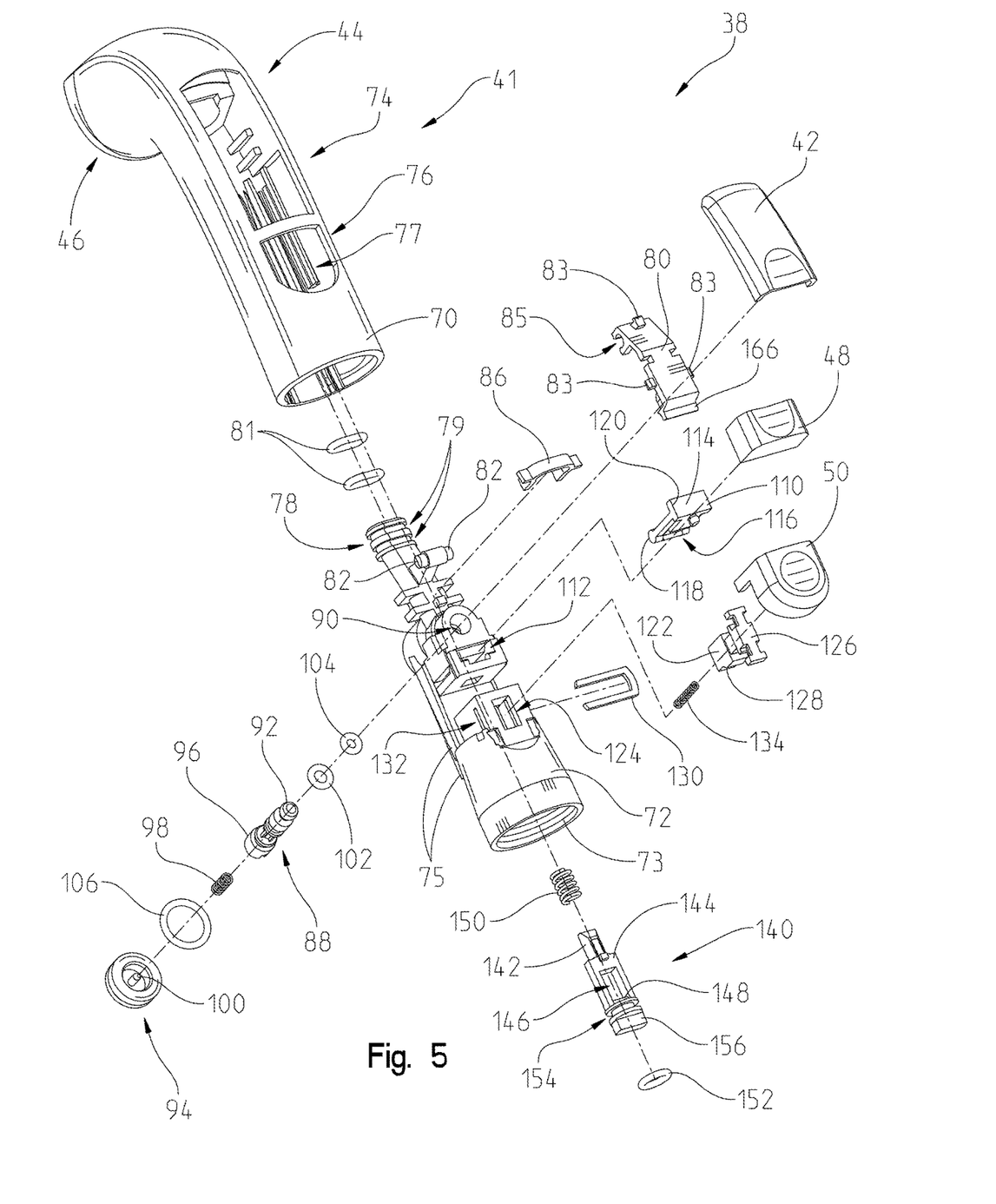
FIG. 5 is an exploded perspective view of the sprayhead of the illustrative side sprayer of FIG. 4.

FIG. 5 is an exploded view of the side sprayer 38. Specifically, FIG. 5 illustrates the inner workings of side sprayer 38, including the body 44 having a housing 70 configured to receive a waterway insert 72 defining a fluid path or waterway 71. The waterway insert 72 is configured to couple to the hose 56 (FIG. 4) via threading 73 so that fluid from the hose 56 (FIG. 4) is in communication with the side sprayer 38 via the waterway 71. The waterway insert 72 includes ridges or rails 75 to facilitate insertion of the waterway insert 72 into the housing 70. For example, the ridges 75 are configured to mate with interior ridges 77 of the housing 70 to ensure the waterway insert 72 is properly positioned within the housing 70 and to prevent rotation of the waterway insert 72 within the housing 70. The waterway insert 72 further includes an extension 78 to be positioned behind the spray nozzle assembly (FIG. 4) to further facilitate positioning of the waterway insert 72 within the housing 70. The extension 78 may include recesses 79 to receive seals 81 to create a fluid-tight seal between the waterway insert 72 and the housing 70 to prevent backflow into the housing 70 during use.

The housing 70 includes an activation opening 74 and a release opening 76. The activation opening 74 is sized and shaped to expose the activation button 42 and the locking button 48 so that each is accessible to the user while also coupled to the waterway insert 72 as described further herein. The release opening 76 is sized and shaped to expose the release button 50 so that the release button 50 is accessible to the user while also coupled to the waterway insert 72 as described further herein. Both the activation button 42 and the locking button 48 are illustratively supported by the waterway insert 72 for movement relative to the housing 70.

Figure 6:
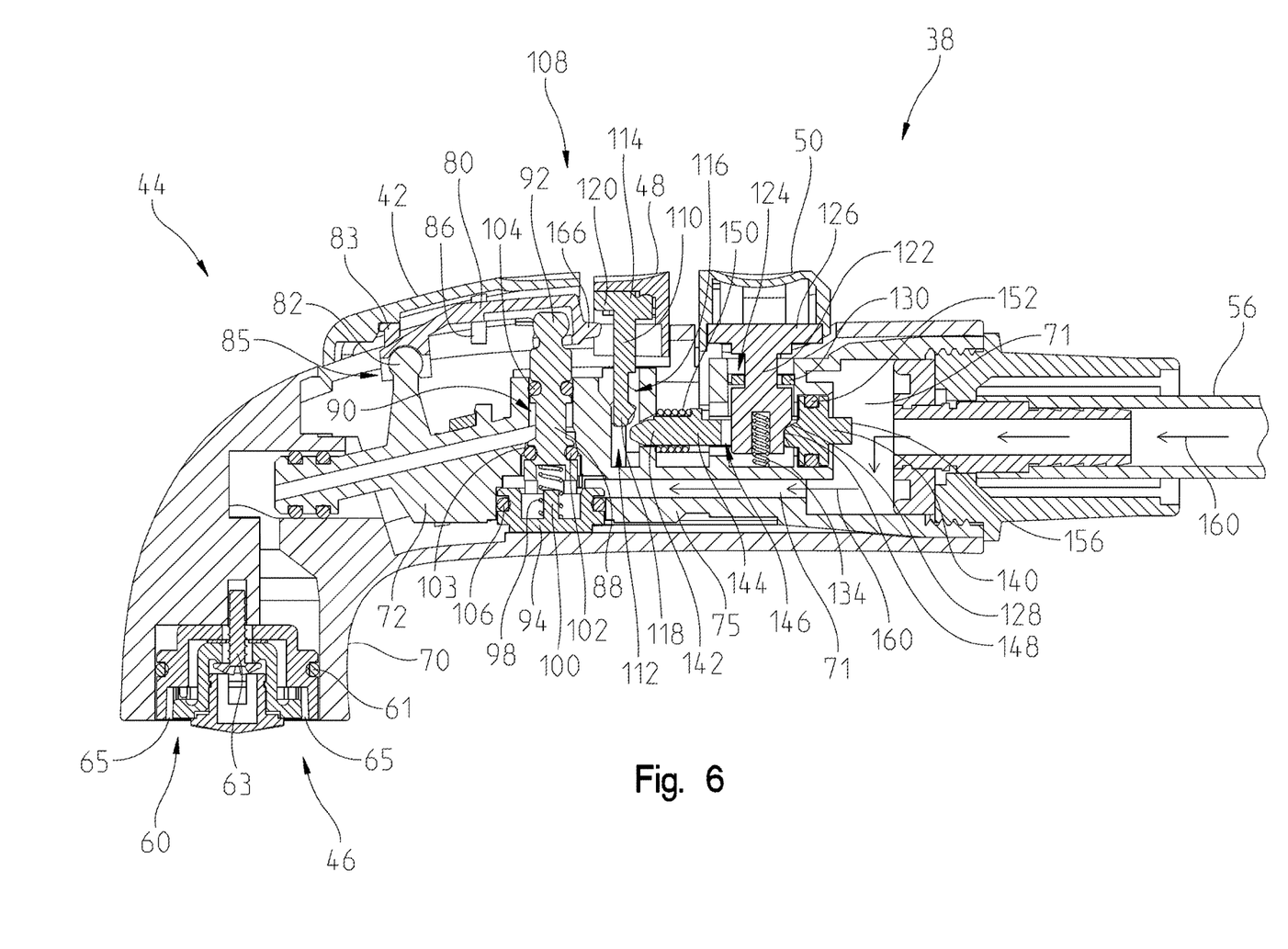
FIG. 6 is a cross-sectional view of the illustrative side sprayer taken along line 6-6 of FIG. 2, wherein the side sprayer is in a first, inactive configuration.

A lever 80 is configured to be positioned under the activation button 42 and couples to the activation button 42 via projections or tabs 83 as shown in FIG. 6. As may be appreciated, the lever 80 may be integral with the activation button 42. Referring again to FIG. 5, the waterway insert 72 includes mounting arms 82 configured to couple with the lever 80 via coupler 84 so that the lever 80 can pivot about the mounting arms 82. A support insert 83 couples to the waterway insert 72 to support a portion of the lever 80 to facilitate the actuation of the lever 80 during operation. More particularly, insert 86 may act as a limit stop for movement of the lever 80.

A first, actuator or activation piston 88 is disposed through the waterway insert 72 to be positioned within operation opening 90 of the waterway insert 72. The activation piston 88 contacts the lever 80 at a first end 92 of the activation piston 88. In certain embodiments, the activation button 42, the lever 80 and/or the activation piston 88 may be integral. A cap 94 is positioned adjacent a second end 96 of the activation piston 88 and a spring 98 is disposed between the cap 94 and the activation piston 88 around a spring pole 100 of the cap 94, wherein the spring 98 biases the activation piston 88 toward the lever 80 as described further herein. Seals 102 and 104 may be disposed around the activation piston 88 to facilitate a fluid-tight fitting between the activation piston 88 and the waterway insert 72 to selectively prevent flow of water throughout the waterway insert 72. More particularly, a seat 103 is defined by the waterway insert 72 and is selectively sealingly engaged by the seal 102. A seal 106 may be disposed around the cap 94 to facilitate a fluid-tight fitting between the cap 94 and the waterway insert 72 to prevent leaks within the housing 70 of the side sprayer 38.

Still referring to FIGS. 5 and 6, a lock device 108 illustratively includes a locker 110 disposed within the waterway insert 72 and positioned within a locker opening 112 defined by the waterway insert 72. The locker 110 is illustratively coupled to the locking button 48 at a first end 114 of the locker 110 and defines a cut-out or notch 116 near a second end 118 of the locker 110. A flange 120 extends from the locker 110 to selectively contact the lever 80.

A second, release member or piston 122 is disposed within the waterway insert 72 and positioned within a release piston opening 124 defined by the waterway insert 72. The release piston 122 is coupled to the release button 50 at a first end 126 of the release piston 122 and includes a lower cam surface (e.g., angled surface) 128 which faces away from the outlet 46 of the side sprayer 38. A clip 130 is inserted through a clip aperture 132 of the waterway insert 72 to retain the release piston 122. A release spring 134 is at least partially disposed in the release piston 122, as shown in FIG. 6, to bias the release piston 122 toward the release button 50. Illustratively, the release button 50 is supported by the waterway insert 72 for movement relative to the housing 70, and may be integral with the release piston 122.

Referring again to FIG. 5, a diverter 140 is positioned within the waterway insert 72 as discussed further herein. The diverter 140 includes a locking extension 142 extending from a first end 144 of the diverter 140. The locking extension 142 is configured to selectively cooperate with the notch 116 of the locker 110 as discussed further herein. The diverter 140 further defines a release piston opening 146 which aligns with the release piston opening 124 of the waterway insert 72 and is configured to receive the release piston 122. The diverter 140 further includes a release tab 148 which extends into the release piston opening 146 to contact the cam surface 128 of the release piston 122. A diverter spring 150 is configured to be disposed around the locking extension 142 of the diverter 140 to bias the diverter 140 in a direction substantially away from the locker 110. A seal 152 may be received in a recess 154 near a second end 156 of the diverter 140 to facilitate a fluid-tight connection between the diverter 140 and the waterway insert 72 to prevent leaks within the housing 70 of the side sprayer 38.

Referring further to FIG. 6, the side sprayer 38 is illustrated in a first, inactive or closed configuration. As shown by directional arrows 160 water flows through the hose 56 into the waterway insert 72 positioned within the body 44 of the side sprayer 38. The activation piston 88 is biased toward the lever 80 by the spring 98 positioned between the activation piston 88 and the cap 94 so that the seal 102 creates a fluid-tight seal with the seat 103 of the waterway insert 72 in the fluid path 71 of the waterway insert 72, preventing the fluid from flowing past the activation piston 88 to the outlet 46 of the side sprayer 38. The locker 110 is positioned in the default unlocked position, and the release piston 122 is biased upward by release spring 134 toward the release button 50.

Figure 7:
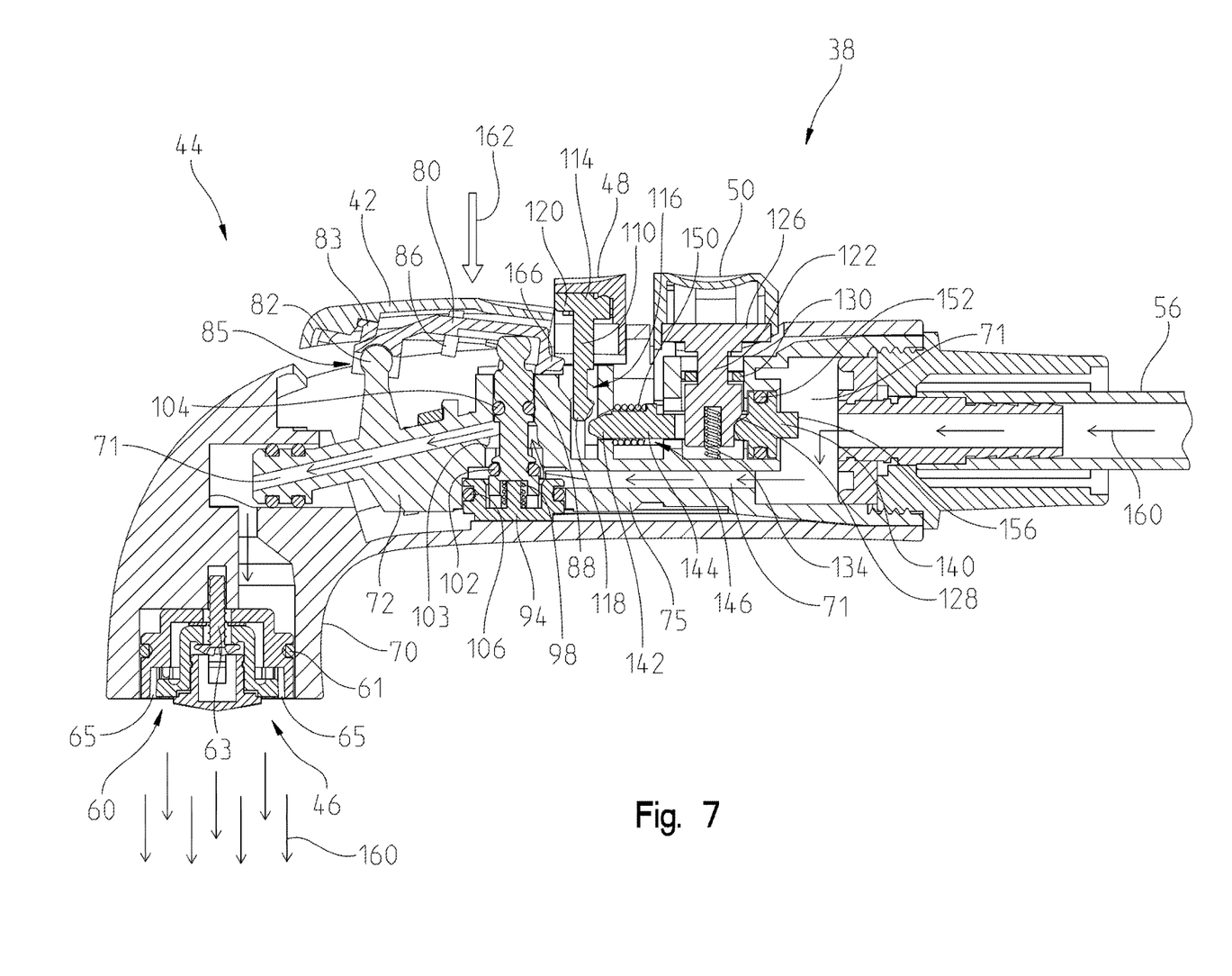
FIG. 7 is a cross-sectional view of the illustrative side sprayer taken along line 6-6 of FIG. 2, wherein the side sprayer is in a second, momentary active configuration.

Now referring to FIG. 7, the side sprayer 38 is illustrated in a second, monetary active configuration. As shown by directional arrow 162, a user may push on the activation button 42 to place the side sprayer 38 in the monetary activated configuration as illustrated. When the activation button 42 is pushed, the lever 80 rotates about the mounting arms 82 via the coupling between the mounting arms 82 and the coupler 85 of the lever 80 to exert a force on the activation piston 88 so that the activation piston 88 moves in a direction away from the activation button 42 against the bias of the spring 98. With such movement, the fluid-tight seal between the seat 103 of the waterway insert 72 and the seal 102 of the activation piston 88 is broken, allowing fluid to flow past the activation piston 88 through the remainder of the fluid path 71 to the outlet 46 of the side sprayer 38. The fluid is then free to move through the spray nozzle assembly 60 and exit the side sprayer 38.

The side sprayer 38 may move from the monetary active configuration of FIG. 7 to the inactive configuration of FIG. 6 by simple release of the activation button 42. In other words, when force is no longer exerted on the activation button 42 in the direction of directional arrow 162, the lever 80 no longer exerts force on the activated piston 88 against the bias of the spring 98, allowing the bias force of the spring 98 to move the activated piston 88 so that the seal 102 again creates a fluid-tight seal with the seat 103 of the waterway insert 72 in the fluid path 724 of the waterway insert 72, preventing the fluid from flowing past the activation piston 88 to the outlet 46 of the side sprayer 38.

Figure 8:
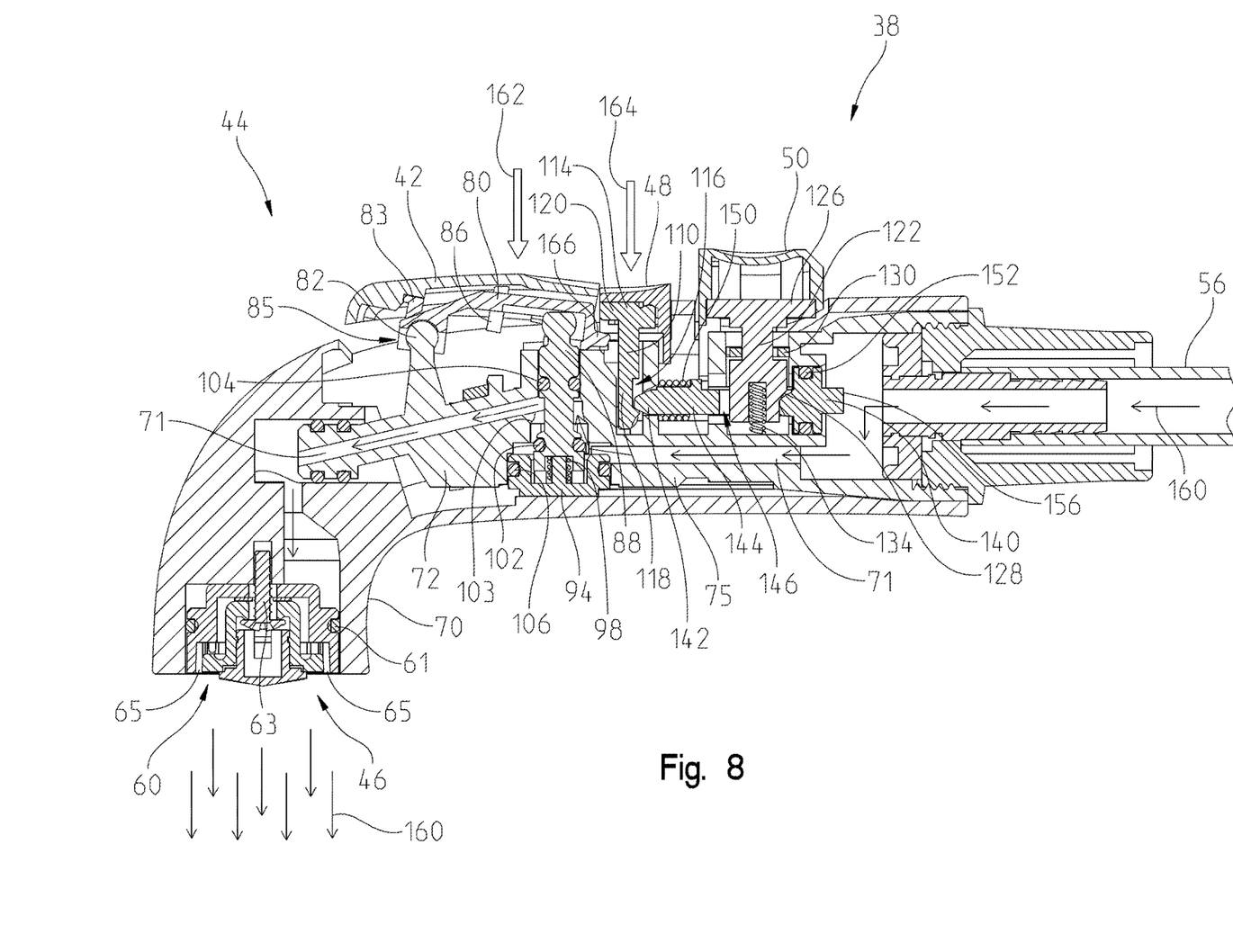
FIG. 8 is a cross-sectional view of the illustrative side sprayer taken along line 6-6 of FIG. 2, wherein the side sprayer is in a third, locked active configuration.

FIG. 8 illustrates the side sprayer 38 in a third, locked active configuration. As shown by directional arrows 162 and 164, a user may push on the activation button 42 and the locking button 48 to place the side sprayer 38 in the locked active configuration. The user may push both the activation button 42 and the locking button 48 at the same time to place the side sprayer 38 in the locked active configuration, or the user may push on the activation button 42 and then push on the locking button 48 to place the side sprayer 38 in the locked operational configuration. As discussed above in reference to FIG. 7, when the activation button 42 is pushed, fluid is allowed to flow past the activation piston 88 through the remainder of the fluid path 71 to the outlet 46 of the side sprayer 38.

When the locking button 48 is pushed, the locker 110 moves in the direction of the force being exerted according to the directional arrow 164. The fluid pressure from the flow of the fluid into the waterway insert 72 pushes the diverter 140 against the bias of the diverter spring 150 so that the extension 142 enters the notch 116 of the locker 110 as the notch 116 is exposed to the diverter 140 due to the exerted force, holding the locker 110 in the locked operational configuration. In the locked operational configuration, the flange 120 of the locker 110 prevents the lever 80 from returning to the non-operational configuration by contacting the lever 80 via a back flange 166 of the lever 80. In other words, the locker 110 continues to exert pressure on the lever 80 in the direction of arrow 162 to keep the activation piston 88 in the operational position against the bias force of the spring 98 to allow fluid to flow past the activation piston 88 through the fluid path 71 to the outlet 46 of the side sprayer 38.

Figure 9:
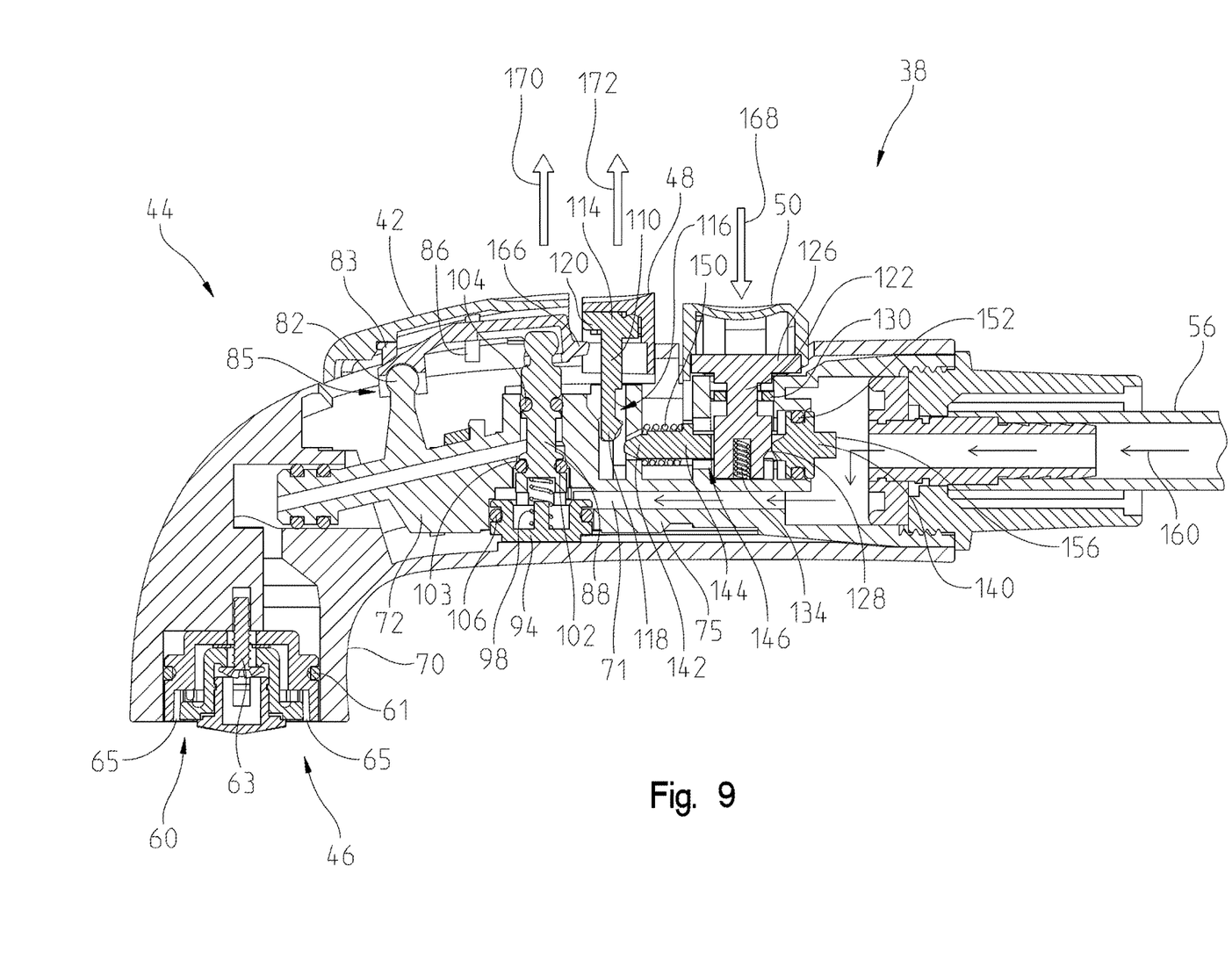
FIG. 9 is a cross-sectional view of the illustrative side sprayer taken along line 6-6 of FIG. 2, illustrating a transition of the side sprayer from the third, locked operational configuration to the first, inactive configuration using a release button of the side sprayer.

FIG. 9 illustrates an example of returning the side sprayer 38 to the inactive configuration of FIG. 6 when the side sprayer 38 was previously in the locked active configuration of FIG. 8. As shown by directional arrow 168, a user may push on the release button 50 to move the side sprayer 38 from the locked active configuration to the inactive configuration. When the release button 50 is pushed, the release piston 122 moves in the direction of the force being exerted according to the directional arrow 168. As the release piston 122 moves, the release tab 148 of the diverter 140 slides along the lower cam surface 128, pushing the diverter 140 in a direction away from the locker 110. As the diverter 140 is pushed via movement along the lower cam surface 128 of the release piston 122, the extension 142 exits the notch of the locker 110.

Without the extension 142 of the diverter 140 holding the locker 110 in the locked configuration, no force is exerted on the locker 110, and therefore no force is being exerted on the back flange 166 of the lever 80 by the flange 120 of the locker 110. without such pressure, the activated piston 88 is biased toward the lever 80 by the spring so that the fluid path 71 is again blocked as described above. The side sprayer 38 may also return to the non-operational configuration from the locked operational configuration when fluid stops flowing through the side sprayer 38 via the hose 56. For example, if a user turns either cold handle 22 or hot handle 24 (FIG. 1) to operate respective valves to prevent the flow of water between the cold supply 26 or the hot supply 28 (FIG. 1), the fluid flow into the waterway insert 72 stops. Fluid pressure is no longer exerted on the diverter 140 against the bias force of the diverter spring 150, and so the diverter 140 moves according to bias of the diverter spring 150 in a direction away from the locker 110. The locker 110, lever 80, and activated piston 88 then operate as described above to return the side sprayer 38 to the inactive configuration.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

What is claimed is:

1. A sprayer assembly comprising:
   a housing;
   a waterway insert positioned within the housing and defining a waterway;
   a first button supported by at least one of the housing or the waterway insert;
   a first piston operably coupled to the first button, the first piston movable between a first position and a second position, the first piston in the first position preventing fluid flow through the waterway from the inlet to the outlet, and the first piston in the second position permitting fluid flow through the waterway from the inlet to the outlet;
   a second button supported by at least one of the housing or the waterway insert;
   a locker operably coupled to the second button, the locker movable to an engaged position to maintain the first piston in the second position;
   a diverter disposed within the housing and in selective engagement with the locker, the diverter configured to selectively maintain the locker in the engaged position;
   a third button supported by at least one of the housing or the waterway insert; and
   a second piston operably coupled to the third button and to the diverter.

2. The sprayer assembly of claim 1, wherein the second piston is movable between a first position and a second position, the second piston in the second position configured to disengage the diverter from the locker.

3. The sprayer assembly of claim 2, wherein the diverter includes a piston opening receiving the second piston, the second piston including a cam surface configured to engage and move the diverter when the second piston moves from the first position to the second position.

4. The sprayer assembly of claim 1, wherein the first button is integral with the first piston, the second button is integral with the locker, and the third button is integral with the second piston.

5. The sprayer assembly of claim 1, further comprising a lever operably coupled to the first button and to the first piston, the lever pivotably supported by the waterway insert.

6. The sprayer assembly of claim 5, wherein the lever is in selective engagement with the locker.

7. The sprayer assembly of claim 5, wherein the first button is integral with the lever.

8. The sprayer assembly of claim 1, wherein continuous force applied to the first button places the sprayer assembly in a first configuration, wherein the first piston moves away from the first button to the second position and allows fluid to flow to the outlet of the housing.

9. The sprayer assembly of claim 8, wherein force applied to the second button locks the sprayer assembly in a second configuration, wherein the locker maintains the first piston in the second position and the diverter contacts the locker so that the locker is held in the engaged position.

10. The sprayer assembly of claim 9, wherein force applied to the third button releases the locker from the engaged position, and the sprayer assembly returns to the first configuration wherein the first piston is in the first position to prevent water flow through the waterway from the inlet to the outlet.

11. The sprayer assembly of claim 9, wherein when pressurized water is no longer supplied to the inlet, the diverter releases the locker from the engaged position, and the sprayer assembly returns to the first configuration wherein the first piston is in the first position to prevent water flow through the waterway from the inlet to the outlet.

12. A sprayer assembly comprising:
   a hose; and
   a body fluidly coupled to the hose, the body including:
      a waterway insert positioned within the housing;
      a lever coupled to the waterway insert;
      a first button operably coupled to the lever;
      a first piston operably coupled with the lever;
      a first spring operably coupled with the first piston to bias the first piston toward the lever;
      a locker in selective contact with the lever;
      a second button operably coupled to the locker, the locker defining a receiving notch;
      a diverter disposed within the waterway insert and in selective contact with the receiving notch of the locker, the diverter defining a piston opening and a spring operably coupled to the diverter to bias the diverter away from the locker;
      a second piston disposed through the piston opening of the diverter, the second piston including a cam surface in selective contact with the diverter; and
      a third button operably coupled to the second piston.

13. The sprayer assembly of claim 12, further comprising a base on which the body is selectively positioned and through which the hose is disposed, and a mount coupled to the base, the hose being disposed through the mount.

14. The sprayer assembly of claim 12, wherein exerting pressure on the first button places the sprayer assembly in a first configuration, wherein the lever contacts the first piston to move the first piston against the bias of the first spring and allow fluid to flow past the first piston.

15. The sprayer assembly of claim 12, wherein exerting pressure on the second button places the sprayer assembly in a second configuration, wherein the locker contacts the lever so that the lever contacts the first piston to hold the first piston in a position against the bias of the first spring, and the diverter engages the receiving notch of the locker to hold the locker in the second configuration to allow fluid to flow past the first piston.

16. The sprayer assembly of claim 15, wherein exerting pressure on the third button places the sprayer assembly in a third configuration, wherein the second piston is moved in a direction away from the third button so that the diverter travels along the cam surface of the second piston, moving the diverter in a direction away from the locker and allowing the locker to move in a direction toward the second button and away from the lever, and the first piston is biased into a position which does not allow fluid to flow past the first piston.

17. A sprayer assembly comprising:
a housing;
a waterway extending within the housing;
an activation input supported for movement relative to the housing;
an activation valve member operably coupled to the activation input, the activation valve member movable between a closed position and an open position, the activation valve member in the closed position preventing fluid flow through the waterway, and the activation valve member in the open position permitting fluid flow through the waterway;
a lock input supported for movement relative to the housing;
a lock device operably coupled to the lock input, the lock device movable between a released position and a locked position to maintain the activation valve member in the open position;
a reset input supported for movement relative to the housing; and
a reset device operably coupled to the reset input, the reset device configured to move the lock device from the locked position to the released position.

18. The sprayer assembly of claim 17, wherein the reset device comprises:
a diverter disposed within the housing and in selective contact with the lock device, the diverter configured to selectively maintain the lock device in the lock device position;
a third button supported for movement relative to the housing; and
a second piston operably coupled to the third button and to the diverter.

19. The sprayer assembly of claim 18, wherein the diverter includes a piston opening receiving the second piston, the second piston including a cam surface configured to engage and move the diverter when the second piston moves from the second piston first position to the second piston second position.

20. The sprayer assembly of claim 17, wherein the activation valve member includes a piston with first and second annular seals.

21. The sprayer assembly of claim 20, wherein the activation input includes an activation input button operably coupled to a lever pivotably supported.

22. The sprayer assembly of claim 17, wherein the lock device includes a diverter and a spring.

* * * * *